March 24, 1931.  F. I. DEGEN  1,797,903
AUTOMOBILE SIGNAL
Filed Nov. 14, 1928   2 Sheets-Sheet 1
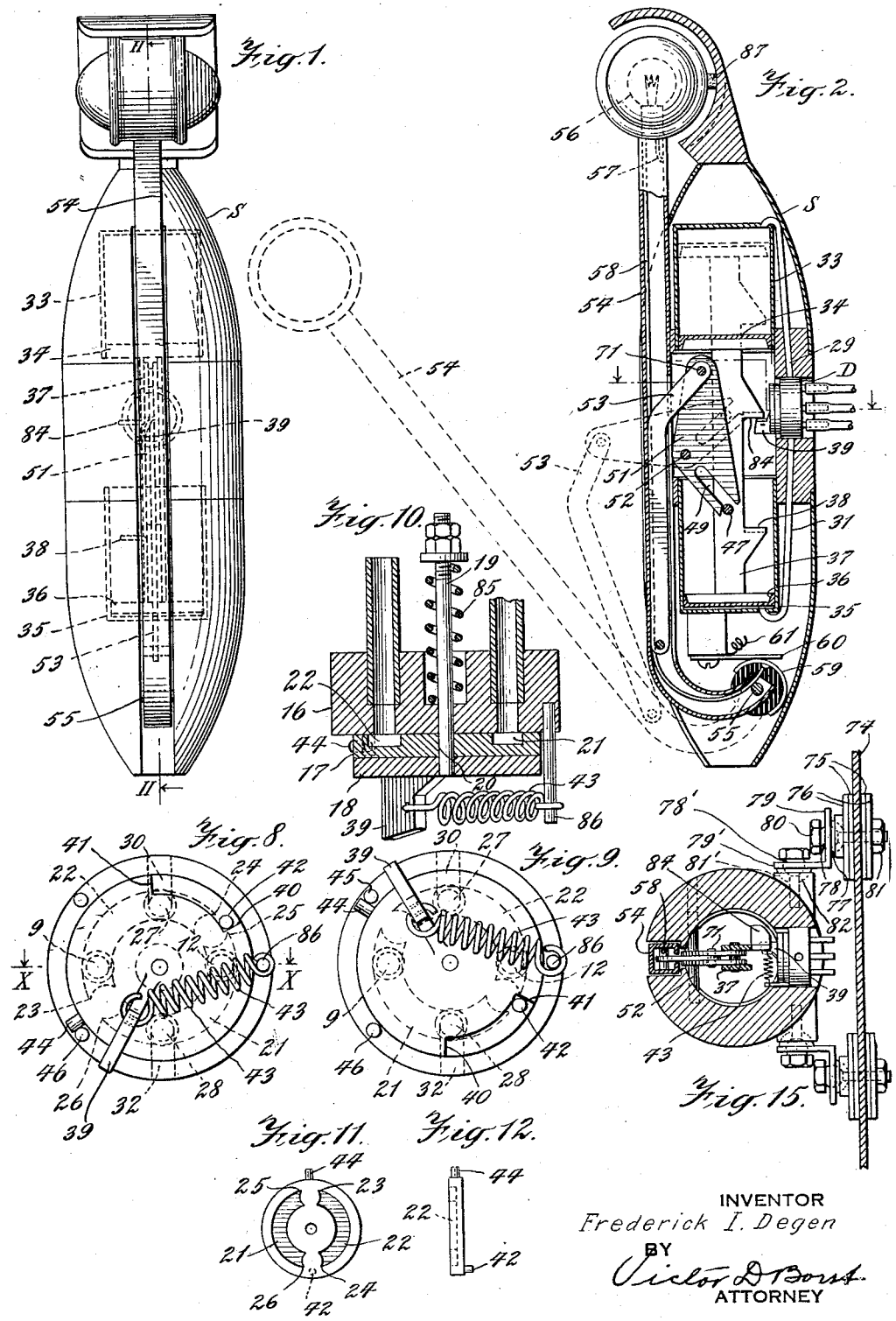
INVENTOR
Frederick I. Degen
BY
Victor D Borst
ATTORNEY

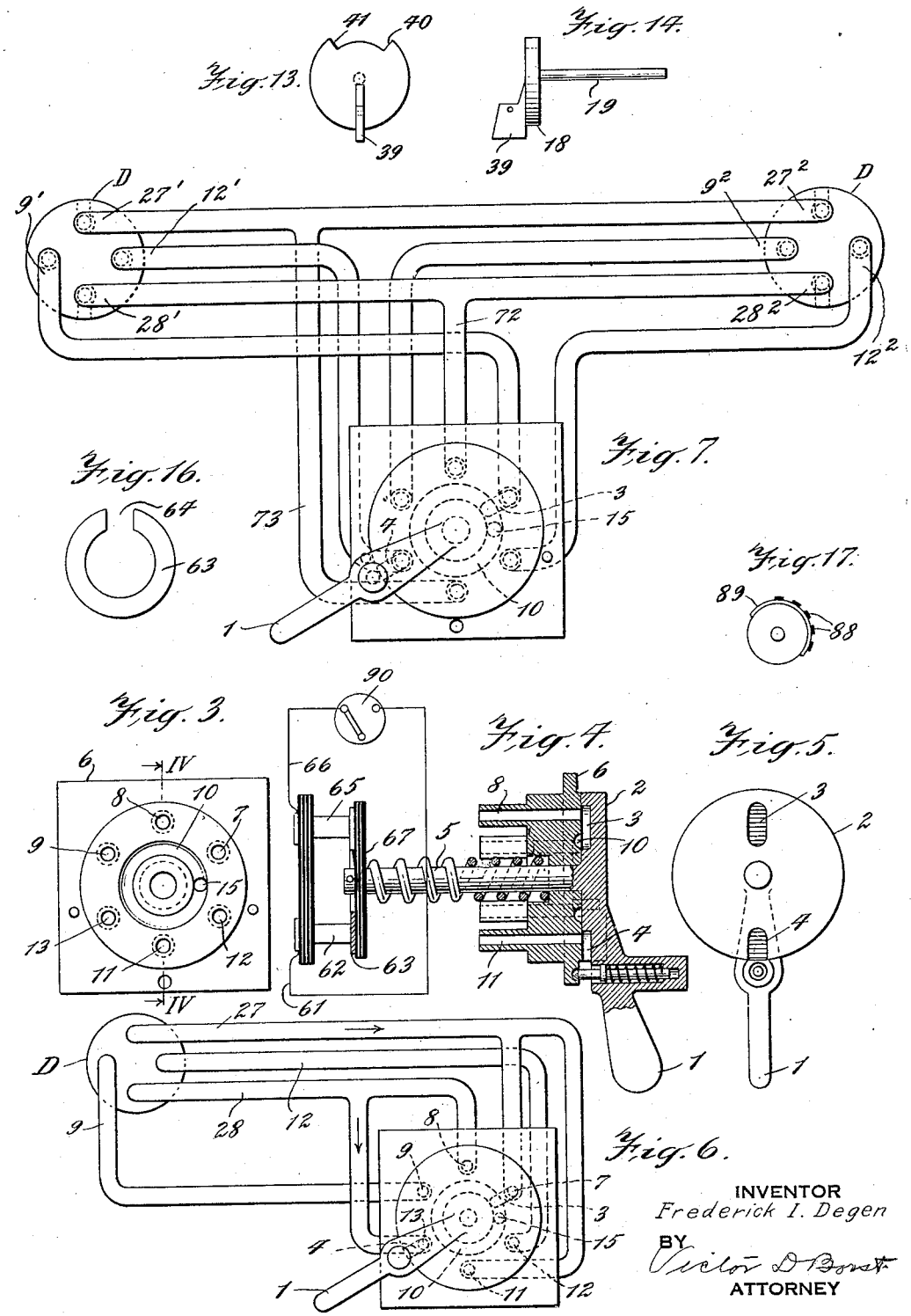

Patented Mar. 24, 1931

1,797,903

UNITED STATES PATENT OFFICE

FREDERICK I. DEGEN, OF RIDGEWOOD, NEW JERSEY

AUTOMOBILE SIGNAL

Application filed November 14, 1928. Serial No. 319,261.

This invention relates to signals, particularly vehicle signals and more especially to signals for indicating the direction a moving vehicle is about to be caused to take.

Every driver or operator of a boat, an airplane or a dirigible and especially an automobile, all of which are broadly included under the term vehicle, is aware of the necessity of correctly and in due time indicating his intentions as to the immediate course of his vehicle, if he intends to depart from his course, to the driver or operator of a following vehicle.

Under many conditions found in modern highways, and by the term highway, it is intended to include water and air courses, it is also equally necessary to convey indications of change of course to persons in advance of the vehicle or somewhat to one side thereof, such, for instance, as in the case of a street intersection where traffic is regulated by a so-called, traffic officer. This is necessary to enable the officer to properly direct other vehicles so that the vehicle bearing the signal may be properly allowed to proceed as desired.

It is also well known that the modern vehicle highways abound in signals, both fixed on the highway and carried by moving vehicles. In order to efficiently signal in such situations it is necessary to display a signal which is of a high degree of visibility and unmistakable in indication.

Due to the immense demands on the manipulative ability of a person, especially in driving an automobile, it is necessary to provide a signal therefor, which may be manipulated satisfactorily with the least mental effort and the least expenditure of physical effort with the least distraction from the other necessary manipulations.

The purpose of this invention is to provide a signal for vehicles, which may be preferably manipulated by what might be called a natural right or left hand movement of a single hand to indicate an intended right or left hand immediate deviation of the vehicle.

A further object is to provide a signal readily and quickly controlled by the exercise of the least physical exertion and to this end there is provided a signal manually controlled but power operated.

A further object of the invention is to provide the power for a signal of the type indicated by utilizing the engine usually associated with vehicles for propulsion purposes.

A further object of the invention is to obviate the necessity for mechanism of the gearing or moving type or a connection from the engine to the signal by employing the suction or vacuum producing effect present in the manifold or intake of the ordinary internal combustion engine, whereby a simple tube, pipe or conduit serves as the connection between the engine and the signal and its control.

It is a further object of this invention to produce a signal device which will give the necessary advance information by indications which will be readily understood and are particularly arrestive in the case of what is generally considered the most dangerous deviation from the straight course, that is, a deviation to the right.

This invention in its broader aspects includes, preferably, a semaphore like arm positioned in a conspicuous position on a vehicle having a, preferably, reciprocating motor connected thereto for the operation thereof. The motor is preferably operated by a suction or vacuum effect and is controlled, preferably, manually, by a valve which so directs the action of the motor that the semaphore may be displayed in three different ways, giving three indications one of which is particularly arrestive as it is produced by a constant up and down motion of the semaphore, or a wig-wag, as it may be designated.

Other objects and advantages will appear as the description of a particular physical embodiment selected to illustrate the invention progresses, and the novel features of the invention will be particularly pointed out in the appended claims.

In describing the invention in detail and the particular physical embodiment selected to illustrate the invention, reference is had to the accompanying drawing, wherein has been illustrated a particular preferred physical embodiment of the invention and wherein like characters of reference designate corresponding parts throughout the several views, and in which:

Figure 1 is a front elevational view of a signal device embodying part of applicant's invention; Fig. 2, is a cross-sectional elevational view of the device as shown by Fig. 1 on the plane indicated by the line II—II, Fig. 1, viewed in the direction of the arrows at the ends of the line; Fig. 3, is a top plan view of a manually operable controlling valve embodying part of applicant's invention with the manually operable part removed; Fig. 4 is a cross-sectional view of the complete device as shown partially in plan by Fig. 3 on a plane indicated by the line IV—IV, viewed in the direction of the arrows at the ends of the line; Fig. 5, is a bottom plan view of the manually operable portion of the valve as shown by Fig. 4; Fig. 6, is a somewhat schematic view of the valve as shown by Fig. 4 together with air pressure conducting conduits or pipes shown as connected to a directing valve, which forms a portion of the device as shown by Fig. 2; Fig. 7 is a view, somewhat schematic, and somewhat similar to Fig. 6 but showing the use of the valve Fig. 4, for controlling two signals, one to the left and one to the right of a vehicle; Fig. 8 is an elevational view of a directing valve, forming part of the device as shown in Fig. 2, with the parts shown in one extreme position; Fig. 9 is a view similar to Fig. 8 and of the same parts as shown in Fig. 8 but with the parts in another extreme position; Fig. 10 is a cross-sectional view of the device as shown in Fig. 8 on a plane indicated by the line X—X viewed in the direction of the arrows at the ends of the line; Fig. 11 is a face view and Fig. 12 is a side view of a member forming part of the device as shown in Fig. 8; Fig. 13 is a face view and Fig. 14 is a side view of a member forming part of the device as shown in Fig. 8 and known as a valve actuator; Fig. 15 is a top plan view illustrating the method and the means for supporting the signal upon a vehicle body; Fig. 16, is a face view illustrating a conducting segment used with applicant's invention; Fig. 17, is a detail view of a modified form of commutator used with the invention.

The device selected to illustrate the invention comprises generally a signal, S, as shown in Fig. 2, including a directing valve, D; a manually operable valve as shown in Fig. 4 and conduits as shown in Fig. 6 and in Fig. 7 for connecting the manually operable valve to the directing valve D.

The general basis of operation of the device is that the suction or vacuum of the internal combustion engine used to drive the vehicle is used as a source of diminished air pressure controlled by the manually operable valve Fig. 4 through the directing valve, D, to cause the signal, S, to display one of three possible aspects; one, in which a semaphore arm is held vertically; another, in which the semaphore arm is held horizontally and a third in which a semaphore is caused to move constantly in a vertical plane in the arc of a circle, that is, to wig-wag.

The different aspects of the signal are to serve as different indications to the driver of a vehicle and are to be interpreted in accordance with custom or any particular set of rules or regulations.

In describing the invention in detail, reference will first be had to Fig. 4. Fig. 4 illustrates what will be known as the manually operable valve. The preferred form of that valve has been illustrated and will be described but it is understood that the particular form selected is not exclusive because it is well known to those skilled in this art that other and different specific forms of manually operable valves might well be used to perform the functions which will be performed by this valve. In the preferred form this valve includes a hand grasping member 1. This hand grasping member 1 is preferably formed integrally with a circular disc valve cap 2, shown in plan in Fig. 5. This valve cap 2 has two cavities formed therein with the mouths thereof opening on the under side of the valve cap. One of these cavities, known as the reduced pressure supply cavity, best shown in Fig. 5, is designated 3. The other cavity, known as the venting or atmospheric pressure cavity is designated 4 and is best shown in Fig. 4. The function performed by manually operable valve cap 2 is to at times connect a chamber of reduced atmospheric pressure or as it might be termed a suction or vacuum with certain conduits used for the control of the signal and at the same time to connect other of the conduits in such a way as to cause them to communicate directly with atmospheric pressure. In order to perform this function the cap 2 is provided with an extended cylindrical stem 5, best shown in Fig. 4. This stem is mounted for rotation in a central bore of the manually operable valve body 6 as best shown in Fig. 4. By partially rotating or oscillating the cap 2 on the stem 5 as a center the cavity 3, as best shown in Fig. 6, is brought into communication with the orifices of the several conduits 7, 8, 9. When the cavity 3 communicates with any one of the said orifices it connects the conduit terminating in that orifice with the chamber of reduced atmospheric pressure or with a vacuum or otherwise expressed causes a suction therein. This is so because cavity 3 in its movements always communicates with the groove 10 formed in the upper face of the body 6. This groove is well shown in Fig. 4 and is also well shown in Fig. 6. The groove 10 is connected by means of a pipe or conduit 15 with a chamber of diminished pressure that is to a partial vacuum or as it may be expressed to a source of suction. Any suitable chamber of reduced pressure may be used to connect with the pipe 15 but it is preferred to create the reduced pressure by means of the motor used for driving the vehicle upon which the signal is placed and it is preferred to obtain this reduced pressure or suction, in case an internal combustion engine of the usual form is used, by connecting the pipe 15 direct to the manifold or intake of the engine as such connection provides the necessary diminished pressure at the times when it is necessary to operate the signal that is when the vehicle is moving and the engine is running.

The cavity 4 serves to connect conduits 11, 12, and 13 with atmospheric pressure, that is, serves, as it may be said, to vent the said conduits. This is best shown in Fig. 6. The particular conduit vented or orifice connected with cavity 4 depends upon the position of the manually operable handle 1. If that handle is to the left, as illustrated in Fig. 6 conduit 13 is connected to atmosphere. If the handle is in the central position, that is, with the handle pointing downwardly as viewed in Fig. 6, then the conduit 11 is vented. If the handle is moved to the right, as viewed in Fig. 6, then conduit 12 is vented or connected to atmosphere.

The conduits 7, 8, 9, 11, 12, 13 which at one end are connected to the manually operable valve are at the other end connected to the directing valve, D. The directing valve, D, is shown in detail in Figs. 8–14 inclusive and in assembly in position in Fig. 2. The function of the directing valve, D, is to suitably connect the conduits leading to and from the manually operable valve to either one of two cylinders so that one cylinder will at a given instant be connected with the conduit connected with the suction chamber and the other cylinder will be connected with the conduit being vented to atmosphere.

In Fig. 10 a cross section of the directing valve, D, is shown. This cross section illustrated the fact that the directing valve, D, includes a body portion 16, a ported disc valve 17 and a disc actuator 18. The disc actuator 18 is mounted on the stem 19 passing centrally through the body 16 and the ported disc 17 has a bore 20 formed therethrough through which extends the stem 19 upon which the disc may partially rotate or oscillate. All the parts are resiliently held together by spring 85. The disc 17 has the ports 21 and 22 formed therein. These ports do not form a complete circle. They are partial annular grooves. Their extent may be best seen by reference to Figs. 11 and 12 in connection with Figs. 8 and 9 in which a partial annular port 22 extends from the point 23 to the point 24 and the partially annular port 21 extends from the point 25 to the point 26. By so forming the ports 21 and 22 in the disc 17 they are of an extent sufficient to connect one conduit with an adjacent conduit, that is to say, if the conduit into which both conduits 7 and 11 merge as shown in Fig. 6 is designated 27 and the conduit into which 8 and 13 merge is designated 28 and the other two conduits terminating in the directing valve, D, at the left of Fig. 6 are designated 9 and 12 respectively, then, as shown in Fig. 8, port 22 in the position as shown connects conduit 27 with conduit 9 and port 21 connects conduit 12 with conduit 28. The connection of conduits 9 and 27 also includes their connection to the conduit 29, best shown in Fig. 2. This connection is effected by means of the cavity 30 as best shown in Fig. 8. The port 21 not only connects the conduits 12 and 28 but also connects each of these with conduit 31, best shown in Fig. 2, by reason of the cavity 32, as best shown in Fig. 8.

By reason of the connections hereinbefore described, if the manually operable valve handle 1 is moved to the left, as viewed in Fig. 6, the suction chamber through the pipe 15 connects with the groove 10 and this by means of the cavity 3 in the valve cap 2, as best shown in Fig. 6, connects with the conduit 7 which merging with conduit 11 forms conduit 27. The conduit 27 as best shown in Fig. 8 communicates with port 22 and this with port 30 which in turn connects with conduit 29. Conduit 29 connects with the cylinder 33 at the extreme upper or closed end thereof. The creation of a vacuum at this end of the cylinder causes the piston 34 thereof to move inwardly and upwardly as shown in Fig. 2. At the same time the end of cylinder 35 beneath the piston is connected by means of conduit 31 with the port 32 and the port 21 and conduit 28 which conduit, as shown by Fig. 6, communicates with conduit 13. The conduit 13 communicates with vent port 4 and so to atmospheric pressure. With the directing valve, D, in the position as shown by Fig. 8 and the manually operable handle 1 in the left hand position, as shown by Fig. 6, the vacuum or suction or diminished pressure back of the piston 34 and the increased pressure of the atmosphere back of piston 36 causes both to rise and both being connected by the piston rod 37, as shown in Fig. 2, they both rise together.

When rod 38, as viewed in Fig. 2, rises sufficiently for 38 to get into contact with valve actuator 39 a further movement causes valve actuator 18, as shown in Fig. 8, to oscillate on the center formed by stem 20. When this oscillation has become sufficient, the ports 21 and 22 as shown in Fig. 8 will be rotated to a position as shown in Fig. 9 and rod and connecting pistons will remain in the reversed position from that shown in Fig. 2, that is, with the pistons as shown in Fig. 2 in their higher position. This result follows because when port 22 moves into the position as shown in Fig. 9 it does not change the fact that port 30 is still connected to conduit 27 and so to the suction chamber and port 21 in its new position does not change the fact that port 32 is still connected to conduit 28 and so to atmospheric pressure. Thus, even after the valve shifts suction is still applied above piston 34 and atmospheric pressure is still applied below piston 36.

In order to have the valve actuator vane 39 when oscillated shift the valve 17 and so the ports 21 and 22 applicant has formed valve actuator 18 with two spaced shoulders 40 and 41, as best shown in Fig. 8 and has provided ported disc valve 17 with a pin 42, as well shown in Fig. 8. When rod 37 moves upwardly, as viewed in Fig. 2, and shoulder 38 contacts with vane or fin 39 a continuous movement will carry the fin as viewed in Fig. 8 to a horizontal position, moving with it the valve actuator 18 which rotates on the pivot stem 20. As soon, however, as the fin has reached the horizontal position as viewed in Fig. 8 or a little beyond, during which time the shoulder 41 has not travelled far enough to reach pin 42, the spring 43 acting as an over-center throwing device, by reason of its attachment to the fin and its attachment to the pin 86 fixed in the body 16 of the valve, causes a quick further throw of the valve actuating disc so that it reaches the position with the shoulder 41 in contact with pin 42 and moves that pin to position as shown in Fig. 9. This pin 42 being attached or inserted in the ported valve disc 17 causes the valve disc 17 to move to the position as shown in Fig. 9, its limit being determined by the pin 44 attached to the ported valve disc coming in contact with the pin 45 inserted in the body 16 of the valve. There is a corresponding pin 46 which determines the limit of movement of the ported valve disc 17 in the other direction, as shown in Fig. 8.

When piston rod 37 moves to its upper position it causes pin 47 inserted therein to move and contact with the surfaces of the groove 49 formed radially in the plate 51 having the pivot pin 52 of said plate as a center. The movement of the pin 47 causes the partial rotation of plate 51 so that it rotates to the position as shown by dotted lines in Fig. 2, forcing the link 53 outwardly and downwardly and so forcing the semaphore arm 54 pivoted on pin 55 outwardly and downwardly to a position as shown by dotted lines in Fig. 2. This approximate forty five degree position or reverse position of the semaphore 54, as shown in Fig. 2, in one of applicant's preferred aspects of the signal and in accordance with applicant's proposal this position of the semaphore 54 would convey an indication that the vehicle bearing the signal was about to turn to the left. This aspect of the semaphore 54 corresponds very closely and simulates the out-stretched arm of the driver of the vehicle and is readily visible in the day time and may be made particularly visible in the night time by mounting the lamp 56 on the upper or outer end thereof as best shown in Fig. 2. This lamp may be lighted at night but remain unlighted in the day time or it may be lighted both at night and in the day time.

In order to light lamp 56 applicant prefers to ground one side of the lamp as at 57 and to carry a wire 58 from the other side of the lamp down through the hollow arm of the semaphore and electrically connect the same to a contact segment mounted to oscillate on the same pivot 55 as the semaphore arm 54, and to arrange in position to contact therewith, the finger 60, which may be electrically connected by wire 61, as shown in Fig. 2, to the lower electrical contacting brush 62, as shown in Fig. 4. This brush lies in the back of and contacts with the partial metallic contacting annulus 63, shown in detail in Fig. 16. Positioned opposite the cut-away 64 of the annulus 63 is another electrical contact brush 65 and this brush connects as by wire 66 to one side of a suitable source of electromotive force, the other side of which is grounded. By the arrangements described, is readily seen that if the handle 1 is in the central position as viewed in Fig. 6, then the cut-away portion 64 of the partial annulus 63 will be opposite brush 65, consequently the circuit for lighting the lamp 56 will not be formed but if the handle 1 is moved over to the left or to the right, as viewed in Fig. 6, then the stem 5 to which the insulating block 67 is rigidly attached causes block 67 together with the attached partial contacting metallic annulus 63 to move so as to bring brush 65 into contact therewith so that a circuit will be formed through the lamp 56 and the lamp will become lighted.

If preferred, the contact segment 59 of Fig. 2 may be formed as shown in Fig. 17. In this figure the segment is, in effect, corrugated, but the high points 88 of the corrugations are insulators and the low points 89 are conductors. With this form of segment the lamp 56 will be intermittently lighted and extinguished, as the arm 54 oscillates. Semaphore arm 54 would then, especially at night, give a most arrestive signal because it would not only wig-wag but it would flash on and off, that is, wink.

The signal is not only constructed and arranged to be moved from the full line vertical position, as shown in Fig. 2, to the horizontal position as represented by the dotted line position, as shown in Fig. 2, but it is also constructed and arranged to be put into constant motion. This motion is an up and down motion in a vertical plane and may be designated a wig-wag. Such a motion is particularly arrestive, much more so than would be a mere out-standing arm. Applicant desires this constant motion aspect of the signal or semaphore 54 to indicate a right turn and is obtained by moving the manually operable handle 1, as shown in Fig. 6, to the right. When handle 1 is moved to the right and signal 2 is in the full line condition, as shown by Fig. 2, then cavity 3 connects with conduit 9 and conduit 9 through cavity 3, groove 10 and pipe 15 connects with the suction chamber or vacuum or decreased pressure chamber. It will be seen, by reference to Fig. 8, that port 22 connects conduit 9 with port 30 and so to conduit 29, consequently, cylinder 33 above the piston 34 has the pressure therein reduced. At the same time vent cavity 4 in disc cap 2 connects conduit 12 with atmosphere or a region of increased pressure. It will also be observed that conduit 12, as shown in Fig. 8, is connected by means of port 21 with port 32 and so with conduit 31 consequently the space in cylinder 35 below the piston 36 is connected to a region of relatively increased pressure. The result of so connecting cylinders 33 and 35, as just described, is that the pistons 34 and 36 moved upwardly, as viewed in Fig. 2, carrying with them the pin 47 and causing, in a manner hereinbefore described, a movement of semaphore arm 54 to the dotted line position, as shown in Fig. 2. When the abutment 38 reaches valve actuator fin 29 and moves it to the horizontal position, then the spring 43, as shown in Fig. 8 and Fig. 9, completes the movement of the fin 39 to the position as shown in Fig. 9. As hereinbefore described, the movement of the fin 39 to the position, as shown in Fig. 9, through the shoulder 41 causes the ported valve disc 17 to be thrown to the position as shown in Fig. 9, with its pin 44 in contact with pin 45 inserted in the valve body 16. This causes a shifting of the ports 21 and 22. It will now be seen, by reference to Figs. 6 and 9, that conduit 9, as shown in Fig. 6 is connected to suction, but by reference to Fig. 9, it will be seen that conduit 9 through port 21 instead of being connected to port 30, as in Fig. 8, is now connected to port 32 and through port 32 to duct 31. Conduit 12, which with the handle 1 in the right hand position is vented to atmosphere, as shown by reference to Fig. 6, is now not connected to port 32, as shown in Fig. 8, but is connected to port 30 and so to duct 29 and cylinder 33. The shift of the ported valve disc 17, consequently, connects cylinder 35 to suction and cylinder 33 to atmosphere, with the result that the pistons 34 and 36 immediately start to move downwardly, as viewed in Fig. 2, and, consequently, rod 37, through the pin 47 and the plate 51 and link 53, moves the semaphore arm 54 to the full line position, as shown in Fig. 2, that is, returns the semaphore arm to its initial or normal position. In so returning the semaphore to its normal position the rod 37 brought the abutment 84 into contact with the valve actuator fin 39 and moved that fin from the position as shown in Fig. 9 to a horizontal position or a little beyond and then the spring 43 snapped the fin through a further movement to a position as shown in Fig. 8. This movement of the fin 39 carries with it the valve actuator 18 and its shoulder 40 and 41 so that although no movement of the ported valve disc 17 occurred during the movement of the fin 39 from the position, as shown in Fig. 9, to the horizontal position, nevertheless, when the spring 43 caused the quick final throw of the valve actuator 18 the shoulder 40 came into contact with the pin 24 on the ported valve disc 17 and moved that pin into the position, as shown in Fig. 8, so that the limiting pin 44 on ported valve disc 16 came into contact with the pin 46, as shown in Fig. 8 thereby returning the ported valve disc 17 to its final position, as shown in Fig. 8, so that the conduit 9 is again connected through port 22 with the port 35 and so that duct 29 and the cylinder 33 and conduit or duct 12 becomes connected through port 21 with the port 22 and so with duct 31 and the cylinder 36 whereupon the pistons moved as they first moved when handle 1 was moved to the right, as viewed in Fig. 6, and the semaphore 54 is again moved to the dotted line position as shown in Fig. 2. The movement of the semaphore 54 from the full line position, as shown in Fig. 2, to the dotted line position will continue just so long as handle 1 is in the right hand position, as viewed in Fig. 6, so that a continuous movement of semaphore arm 54 is obtained, that is, a wigwag of semaphore arm is obtained creating the most arrestive form of signal aspect for an indication that the vehicle operator is about to make a right turn.

If the manually operable handle 1 is returned so that it is moved to a central position, as viewed in Fig. 6, that is, with the handle 1 pointing directly downwardly, then the cavity 3 will connect with conduit 8 and the cavity 4 with conduit 11. Conduit 8 merges into conduit 28 and conduit 11 merges into conduit 27. If the directing valve, D, and all of its parts is in the condition, as shown in Fig. 8, then conduit 27 will communicate with port 30, duct 29 and upper cylinder 33 connecting that cylinder with atmospheric pressure tending to drive down and hold piston 34 in its lower position, as shown in Fig. 2. At the same time duct 28 will communicate directly with port 32 and so with duct 31 and with the cylinder 35 so that cylinder 35 below the piston 36 will be connected with the chamber of reduced pressure or vacuum or suction tending to cause piston 36 to move to the lowest position in cylinder 35 and remain there. With both pistons 34 and 36 in their lower positions and rod 37 in its lower position the pin 47 will rotate the plate 51 to the full line position, as shown in Fig. 2, and pin 47 will move into a position against shoulder 69 somewhat similar to a Geneva escapement and so act as a lock to prevent a turning of plate 51 on its pivot 52 manually or by a jarring of the vehicle upon which the signal is mounted or by force applied to the upper end of semaphore 54. This locking action is assisted by so correlating the parts that when in the locked position the pivot connection of link 53 with plate 51 at 71 the pivot 52 and the connection of link 53 to arm 54 will lie in one straight line. This in connection with a preferably somewhat resilient abutment 87 at the upper end of arm 54 will act to firmly hold arm 54 in normal position.

In some cases it will be found desirable to mount two signals or semaphores, as 54, on each vehicle. One of these semaphores will be mounted on the right hand side of the vehicle and the other on the left hand side. When such an arrangement is adopted a slightly different method of operating the semaphores would be employed. In such a case if the vehicle driver intended to proceed straight ahead both of the signals would be allowed to remain or be placed in their initial or normal position as shown by Fig. 2. If the driver had the intention of deviating to the left, then the signal on the left hand side of the vehicle would be caused to oscillate or wig-wag. If the driver intended to deviate to the right, then the signal on the right hand side of the vehicle would be caused to oscillate. The proper connections for producing such movements are depicted in Fig. 7. This figure is to be interpreted in connection with the detailed showing of the directing valve, D, illustrated in Figs. 8 and 9. If the manually operable handle 1, as shown in Fig. 7, is moved to the central or neutral or normal position so that the handle, as viewed in Fig. 7, points directly downwardly, the duct 72 would be placed in communication with a chamber of reduced pressure, as will be well understood from the previous description in Fig. 6, as the manually operable valve, itself, as shown in Fig. 7, is identical with the manually operable valve, itself, as shown in Fig. 6 and in Fig. 4, and is connected to the suction chamber by duct 15. The groove 10 and the cavity 3 and the exhaust cavity 4, in Fig. 7, are identical with the like numbered parts in Fig. 6.

In Fig. 7, duct 72 communicates with a duct which extends from the right to the left as viewed in Fig. 7. This duct may be considered as performing a function similar to the duct 28, of Fig. 6, and, consequently, the left hand end of this through duct, as shown in Fig. 7, will be designated 28′ and the right hand end will be designated 28² so that in the further description when reference is made to numeral 28′ or 28² it may be interpreted, in-so-far as Figs. 8 and 9 are concerned, to be 28.

Under the conditions assumed with the manually operable handle 1 of Fig. 7 in the neutral position cavity 4 will connect duct 73 with atmosphere. Duct 73 communicates with a duct which extends right across Fig. 7 from left to right. As this duct performs the same functions as the duct 27 of Fig. 6 the left hand end will be designated 27′ and the right hand end 27² and when in the further description 27′ or 27² if referred to it may be considered in reference to Figs. 8 and 9 to be 27.

With the manually operable handle 1 in the neutral position, as viewed in Fig. 7, both 28′ and 28² will be connected to suction, consequently, port 32 as shown in Fig. 8 will be connected to duct 31 and the lower piston 36 will be urged downwardly to bring the semaphore to the normal position. At the same time, with the handle 1 in the normal position 27′ and 27² will be connected to atmosphere and consequently, as viewed in Fig. 8, will be connected to port 30 and duct 29 so that the piston 34 in cylinder 33 will be urged downwardly by atmospheric pressure also tending to hold the semaphore in the normal or full line position as shown in Fig. 2.

If the handle 1 of Fig. 7 is moved to the left, as shown, then cavity 3 will connect with a duct or conduit which in its functions operates in a manner corresponding to the duct 9 of Fig. 6 consequently the duct will be designated 9′ and when reference is made to duct 9′ in the further description it may be interpreted in connection with Fig. 8 as being 9. At the same time that duct 9′ in Fig. 7 is connected to suction the cavity 4 connects another duct to atmosphere and as this duct corresponds in function with duct 12 of Fig. 6 it will be designated 12′ and in the further description when reference is made to 12′ it may be interpreted in connection with Figs. 8 and 9 to be 12.

Assuming that the handle 1 is in the left hand position, as shown in Fig. 7, then the duct 9′ will be connected to suction and through the port 22 to the port 30 and so to duct 29 and cylinder 33. At the same time duct 12′ through port 21, as shown in Fig. 8, will be connected to port 32 and duct 31 and so to cylinder 35, connecting that cylinder to atmosphere. With such a condition set up the pistons, as shown in Fig. 2, will move upwardly and in due time, as hereinbefore explained, the ported disc valve 17 will be shifted to the position, as shown in Fig. 9, whereupon duct 9′ will become connected with port 32 and so with cylinder 35, applying suction, thereby tending to move the piston 36 downwardly. At the same time duct 12' will become connected through port 22, as shown in Fig. 9, with port 30, duct 29 and cylinder 33 thereby connecting that cylinder with atmospheric pressure tending to force piston 34 thereof downwardly. With the condition as set up as illustrated by Fig. 9, the piston rod 37 will consequently move downwardly and in moving downwardly will again shift the directing valve, D, to the position, as shown in Fig. 8, whereupon the upward movement will again take place. With the setting of the valve handle 1 in the left hand position as shown in Fig. 7 a wig-wag or constant motion of semaphore 54 will take place and as semaphore 54 is assumed to be positioned upon the left hand side of the moving vehicle the aspect will be an indication of the intention on the part of the driver to immediately deviate to the left.

If the handle 1 as illustrated in Fig. 7 is moved to the right then the signal or semaphore 54 on the right hand side of the vehicle will be caused to oscillate indicating an intention on the part of the driver to immediately deviate to the right. This action is obtained in a manner entirely comparable with the manner of obtaining the oscillation of the semaphore positioned on the left of the vehicle. In order that the operation may be traced, if found necessary, the suction pipe when the right hand signal is oscillated performing the same function as the duct 9' on the left hand signal has been designated $9^2$ and the exhaust duct or pipe on the right hand signal performing the same function as pipe 12' on the left hand signal has been designated $12^2$ so that the previous description of the operation of the signal when oscillating on the left hand side applies equally well to the oscillation of the signal on the right hand side if in that description $9^2$ and $12^2$ are substituted for 9' and 12' respectively.

It is to be understood that although in the particular arrangement herein shown, with a signal on each side of the vehicle, the signals have been described as having two positions or conditions, to-wit, a normal or neutral position and a wig-wag position or condition, nevertheless, such description and showing are not intended to exclude the applicability well within the skill of those acquainted with this art to place one signal at, say, the forty-five degree position while the other is wig-wagging.

If it is desired to utilize lamp 56 as a cowl light then by-pass or shunt switch 90 would be manually operated to close a persisting circuit from brush 62 to brush 65.

Any suitable or appropriate means of mounting the semaphore upon the vehicle may be adopted, but in Fig. 15 applicant has illustrated a preferred method. In this figure the vehicle body has been designated 74. On either side of the vehicle body are, preferably, gaskets of rubber 75, and outside of the gaskets of rubber are plates or stanchions 76. One of these stanchions preferably that one on the signal side of body has a ball cavity 77 formed therein to receive a spherical ball like protuberance 78 formed in bracket 79. A ball backed bolt 80 passes through all of the parts and by means of nut 81 holds them rigidly in a fixed position but as the contact surfaces of bracket 78 and stanchion 77 are spherical a universal joint is really produced which allows for all the necessary adjustments and a certain give or motion between the parts preventing a distortion or undue strain thereon. The bracket 79' is formed as an angle member, one side of which is also formed with a spherical protuberance 78' engaging a spherical recess 81' in a member 82 forming part of the signal casing. A ball backed bolt 83 holds the casing and the bracket in engagement but allows the slight movement or give necessary to prevent undue strain or distortion.

Although I have herein described the construction of one particular physical embodiment of the invention and explained the operation thereof, nevertheless, it is desired to have it understood that the form selected is merely illustrated but does not cause the possible physical embodiment of the ideal means of the invention.

What I claim as new and desire to secure by patent of the United States, is:

1. In a vehicle signal, in combination; a pivoted semaphore arm positioned on each side of the vehicle having a normal position, a reverse position and a wig-wag condition; means for operating either semaphore on its pivot so that both may be in normal position or one may be in normal position and the other may wig-wag.

2. In a signal for mounting on a vehicle body, in combination; a semaphore arm; a casing for the semaphore arm; a pivot supported by the casing upon which the arm pivots; means within the casing for causing the arm to pivot; a bracket positioned on each side of the signal casing; means including ball and socket joints to support the casing by the brackets; and means including ball and socket joints to support the bracket by the vehicle body.

3. In a vehicle signal actuating mechanism, in combination; a reciprocatable member; means to reciprocate the member; a spaced pin borne by the member; a pivoted plate formed with a radial slot and a locking shoulder so positioned that the pin engages the slot and swings the plate on its pivot and at the extreme of movement in one direction the pin engages the shoulder to lock the plate against manual pivoting and a signal actuated by the plate.

4. In a vehicle signal actuating mechanism, in combination; a pivoted plate; a link connected to the plate; a pivoted arm; an abutment for the arm; means pivotally connecting the link and arm so that when the arm is against the abutment the pivot of the plate, the link connection to the plate and the said means all lie in one straight line.

5. In a vehicle signal actuating mechanism, in combination; a pivoted plate; a link connected to the plate; a pivoted arm; an abutment for the arm, means pivotally connecting the link and arm so that when the arm is against the abutment the pivot of the plate, the link connection to the plate and the said means all lie in one straight line and means for locking the plate against manual operation and rattling.

6. In a vehicle signal motor, in combination; two opposed cylinders; a piston in each cylinder; two ducts, one opening in one cylinder back of the piston and the other opening in the other cylinder back of the piston; a valve body formed with one port connecting one duct and another port connecting the other duct; two supply ducts terminating in the valve body; an oscillatable valve formed with two ports, one of said ports connecting one of the supply ducts with one of the first mentioned ducts and the second of the said ports connecting the other supply duct with the other first mentioned duct and means operated by the motion of the pistons to reverse the said connections of supply ducts with the first mentioned ducts.

7. In a vehicle signal on a vehicle provided with an internal combustion engine provided with an intake in which a vacuum is produced by the action of the engine, in combination; a semaphore mounted for oscillation; a pair of opposed cylinders; pistons in the cylinders; a piston rod provided with spaced facing valve abutments; a plate adjacent the rod provided with a pivot and formed with a slot radiating on a line through the pivot, provided adjacent its portion remote from the pivot with a shoulder; a pin supported by the rod and positioned to engage in the slot and so positioned to engage with the said shoulder when the rod is at the extreme of its motion in one direction; a link connecting the semaphore and plate in such wise that when the plate is at one extreme of its positions with the pin in contact with the shoulder, the connection of the link to the semaphore, the connection of the link to the plate and the pivot of the plate are in one straight line whereby the semaphore is locked against manual manipulation and rattling and whereby when the shoulder contacting pin is in the opposite extreme of its movement the semaphore is in a position quite remote from the locked position and whereby a continuous reciprocation of the rod causes a continuous reciprocation of the semaphore and means including the shoulders on the rod for causing a continuous reciprocation of the rod.

8. In a vehicle signal, in combination; a semaphore mounted for oscillation; a motor; means operated by the motor for causing a reversal of the motor; means connecting the motor and the semaphore; means for supplying energy to the motor in a plurality of ways whereby the semaphore is displayed in anyone of a plurality of different conditions one of which is a constant motion thereof.

In witness whereof, I hereunto subscribe my signature.

FREDERICK I. DEGEN.